(12) United States Patent
Kitamura et al.

(10) Patent No.: US 7,076,145 B2
(45) Date of Patent: Jul. 11, 2006

(54) LIGHT TUNNEL RETENTION AND ADJUSTMENT APPARATUS

(75) Inventors: Takatoyo Kitamura, Osakasayama (JP); Stephen Dorow, Portland, OR (US); Wong Tuck Meng, Singapore (SG)

(73) Assignee: In Focus Corporation, Wilsonville, OR (US)

( * ) Notice: Subject to any disclaimer, the term of this patent is extended or adjusted under 35 U.S.C. 154(b) by 27 days.

(21) Appl. No.: 10/956,264

(22) Filed: Oct. 1, 2004

(65) Prior Publication Data

US 2006/0008228 A1 Jan. 12, 2006

Related U.S. Application Data

(60) Provisional application No. 60/586,186, filed on Jul. 7, 2004.

(51) Int. Cl.
*G02B 6/00* (2006.01)
(52) U.S. Cl. .................. 385/134; 385/147; 353/122
(58) Field of Classification Search .............. 353/122
See application file for complete search history.

(56) References Cited

U.S. PATENT DOCUMENTS

| 5,538,509 A | * | 7/1996 | Dunlap et al. ............. 604/264 |
| 6,156,275 A | | 12/2000 | Dumitrescu et al. ........ 422/104 |
| 6,364,493 B1 | * | 4/2002 | Kakuta et al. ............. 353/122 |
| 6,773,118 B1 | * | 8/2004 | Lee ........................ 353/122 |
| 2004/0090598 A1 | * | 5/2004 | Morinaga .................. 353/20 |
| 2005/0024601 A1 | * | 2/2005 | Morinaga .................. 353/87 |

OTHER PUBLICATIONS

Patent Abstracts of Japan for Publication No. 2000182528, published Jun. 30, 2000 for Mitsubishi Electric Corp. (English Language Abstract).
Patent Abstracts of Japan for Publication No. 2003177468, published Jun. 27, 2003 for Tamron Co. Ltd. (English Language Abstract).
International Search Report for PCT/US2005/014620 dated Jul. 27, 2005.
Written Opinion of the International Searching Authority for PCT/US2005/014620 dated Jul. 27, 2005 for Infocus Corporation.

* cited by examiner

*Primary Examiner*—Michelle Connelly-Cushwa
*Assistant Examiner*—Rhonda S. Peace
(74) *Attorney, Agent, or Firm*—McDonnell Boehnen Hulbert & Berghoff LLP

(57) ABSTRACT

A light tunnel retention and adjustment mechanism for retaining and aligning a light tunnel in a light tunnel assembly. The light tunnel retention and adjustment mechanism includes one or more first compliant spring fingers that interface with the light tunnel along a first surface to provide a compliant spring force for adjusting alignment of the light tunnel in a first axis and fixedly retaining the light tunnel in position in the first axis. The light tunnel retention and adjustment mechanism further includes one or more second compliant spring fingers that interface with the light tunnel along a second surface and provide a compliant spring force for adjusting alignment of the light tunnel in a second axis and fixedly retaining the light tunnel in position in the second axis. The light tunnel retention and adjustment mechanism may be formed as a single piece.

23 Claims, 5 Drawing Sheets

LIGHT TUNNEL RETENTION AND ADJUSTMENT APPARATUS

CROSS REFERENCE TO RELATED APPLICATIONS

This application claims priority benefits under 35 U.S.C. § 119(e) to U.S. Provisional Patent Application No. 60/586,186, filed on Jul. 7, 2004. The entire disclosure of U.S. Provisional Patent Application No. 60/586,186 is incorporated by reference herein in its entirety.

FIELD OF THE INVENTION

This invention is related to the field of projection devices, such as digital projectors for business, educational, government and/or entertainment applications. More particularly, the invention is related to retention and adjustment of light tunnels in such projection devices.

BACKGROUND

1. Overview

Display technology (e.g., for use in computer and entertainment display devices) continues to advance, as generally is the case with consumer and business electronics. One particular type of display device that is commonly used is projection display systems (hereafter "projectors"), such as digital display systems. A wide variety of such a projection systems is available from InFocus Corporation of Wilsonville, Oreg., the assignee of the present application.

Projectors, such as those manufactured by InFocus, typically include an optical subsystem that integrates light from an illumination source (e.g., a high pressure mercury lamp) for projecting images (e.g., still or moving) onto a display surface, such as a screen or wall. One component that may be included in the optical subsystem of such projectors is a light tunnel, which operates as a light integrating device. The operation of one embodiment of a light tunnel is described in U.S. Pat. No. 6,419,365 to Potekev et al., which is assigned to InFocus, the assignee of the present application. U.S. Pat. No. 6,419,365 is incorporated by reference herein in its entirety.

It may be necessary, from time to time, to "adjust" such light tunnels (or the path of light communicated out of the tunnel) so that the tunnel (or light from the tunnel) is properly aligned with other components of the optical subsystem (e.g., a light source, lenses). For example, light tunnel adjustments are typically done during the manufacture of the projector. In addition to the initial light tunnel adjustment performed during manufacturing, subsequent adjustments may be needed if, for example, the projected is physically jarred resulting in the light tunnel becoming misaligned due to such a mechanical shock. Further, such an adjustment may be made during service of the projector, such as when one or more components of the optical subsystem are replaced.

2. Current Adjustment Techniques

Two common approaches that are used for adjusting the path of integrated light produced by a light tunnel are mechanical adjustment of the light tunnel and mechanical adjustment of another component of the optical subsystem, such as a mirror device. In applications employing mechanical adjustment of the light tunnel, the adjustment is accomplished by physically moving the light tunnel with respect to the other components in the system. For example, one end of the light tunnel may be moved while the other end of the light tunnel remains in a fixed position with respect to an illumination source. Such light tunnel adjustment is typically done orthogonally, along multiple Cartesian axes (e.g., the x-axis and the y-axis, with the z-axis being fixed), though other mechanical adjustment techniques may be used. Current approaches for effecting such adjustments, however, employ numerous parts and are somewhat mechanically complex. In comparison, for applications employing mechanical adjustment of another optical component in the projector, the light tunnel is mounted in a fixed position and an optical path of the integrated light produced by the tunnel is adjusted by mechanically adjusting the alignment of the other optical component, such as a mirror device, a lamp, or any other suitable component. Such adjustments are effected using techniques that have similar mechanical complexity as techniques for mechanical adjustment of a light tunnel.

An example of a prior art system that employs mechanical adjustment of a light tunnel is shown in FIGS. 1 and 2. FIG. 1 shows a disassembled light tunnel mounting and adjustment assembly (hereafter "tunnel assembly") 100. The tunnel assembly 100 includes a light tunnel 110 that is used to integrate light from a light source (not shown) for use in the projection of images. The tunnel is mounted inside of a two part clamshell mounting tube 120, which is in turn mounted inside a main optics chassis 130. Retention springs 140 are located around the sides of the tunnel 110 when mounted in the mounting tube 120 (e.g., between the inner surface of the mounting tube 120 and the exterior surface of the light tunnel 110). The springs 140 each exert a force on the sides of the light tunnel 110 to fixedly retain it in position in the mounting tube 120. Adjustment screws 150 are threaded through the optics housing 130 and also may extend through the sides of the mounting tube 120. The adjustment screws 150 are used to adjust the alignment of the light tunnel 110 in the tunnel assembly 100. To effect such an adjustment, the screws exert a force on the light tunnel 120 (either directly or indirectly) to move it along a respective Cartesian axis (e.g., the x-axis or the y-axis). The compliance of the springs 140 allows for such movement of the light tunnel 110.

FIG. 2 illustrates the location of the adjustment screws 150 in the optics housing 130. Once an adjustment to the alignment of the light tunnel 110 in the tunnel assembly 100 is made, the forces exerted on the light tunnel 100 by the springs 140 and the adjustment screws 150 retain the light tunnel 110 fixedly in the new alignment position.

The tunnel assembly 100 further includes a shield 160. The shield 160 protects the light tunnel from excessive light, heat and/or radiation generated by the light source of a projector in which the tunnel assembly is implemented. Such excessive light, heat and/or radiation would otherwise cause thermal damage to adhesives and optical coatings that are included in the light tunnel 110.

FIGS. 3 and 4 illustrate an alternative, prior art light tunnel assembly 300, which employs mechanical tunnel adjustment techniques. In FIGS. 3 and 4, elements that are analogous with the elements of FIGS. 1 and 2 are referenced with like 300 series numbers. FIG. 3 shows, in similar fashion as FIG. 1, a disassembled tunnel assembly 300. The tunnel assembly 300 includes a light tunnel 310 and a clamshell mounting tube 320. The light tunnel 310, however, includes a shield 360 to protect the light tunnel 310 from excessive light, heat and radiation, as opposed to the discrete shield 160 the tunnel assembly 100. The shield 360 in FIG. 3 is an adhesive backed metal foil that is affixed to the light tunnel 310.

The tunnel assembly 300 also includes a main optics chassis 330 in which the assembled light tunnel 310 and mounting tube 320 are installed. Retention springs 340 are installed on the inner surface of the mounting tube 320 on posts 342. As with the springs 140 in the tunnel assembly 100, the springs 340 each exerts a force on a respective side of the tunnel 310 to fixedly retain it in position in the mounting tube 320. Adjustment screws 350 are inserted through the optics housing 330 and may extend through the posts 342. The adjustment screws 350 are used to adjust the alignment of the light tunnel 310 in the tunnel assembly 300. To effect such an adjustment, the screws exert a force on the light tunnel 320 (either directly or indirectly) to move it along a respective axis (e.g., the x-axis or the y-axis). The compliance of the springs 340 allows for such movement of the light tunnel 310. Once an adjustment to the alignment of the light tunnel 310 in the tunnel assembly 300 is made, the forces exerted on the light tunnel 310 by the springs 340 and the adjustment screws 350 retain the light tunnel 310 fixedly in the new alignment position.

As may be seen from FIGS. 1–4, the tunnel assemblies 100, 200 includes numerous parts and are somewhat complex in construction. Such assemblies may require a high level of precision in manufacturing to insure that all of the components of the tunnel assembly are properly installed and that the tunnel assemblies will mechanically operate (e.g., adjust) as expected. Therefore, light tunnel assemblies that are less complex and employ fewer parts are desirable.

Referring to FIG. 5, a light tunnel retention mechanism 500 is shown. The retention mechanism 500 is implemented in a light tunnel assembly that employs mechanical alignment of a mirror device. The retention mechanism 500 is employed to retain a light tunnel 510 in a fixed position in an optics chassis 530. The light tunnel 510 is held fixedly in place by two y-axis spring fingers 540 and two x-axis spring fingers 545. Additionally, the light tunnel 510 is held in place in the z-axis by the optics chassis 530 and the retention mechanism 500.

As may be seen in FIG. 5, the retention mechanism 500 is installed over posts 536, which may properly align the retention mechanism with the optics chassis for retaining the light tunnel 510 in a fixed position. For the tunnel assembly shown in FIG. 5, mechanical adjustment of the tunnel position is not possible. Once the retention mechanism 500 is installed, in the tunnel assembly of FIG. 5, the light tunnel 510 will remain in a substantially fixed position.

For the tunnel assembly shown in FIG. 5, light tunnel adjustment is accomplished by mechanically adjusting another component in the optical subsystem. Specifically, an optical device, such as a mirror device (not shown) is mechanically adjusted to modify the path of integrated light from the light tunnel 510. Thus, while the projector of FIG. 5 employs fewer components for retaining the light tunnel 510 than the tunnel assemblies shown in FIGS. 1–4, the projector of FIG. 5 additionally requires a mechanical system to adjust the alignment of a mirror device (or other component) that is of similar mechanical complexity to the light tunnel adjustment systems shown in FIGS. 1–4.

BRIEF DESCRIPTION OF THE DRAWINGS

Exemplary embodiments are described herein with reference to the drawings, in which.

DETAILED DESCRIPTION

Figure 1:
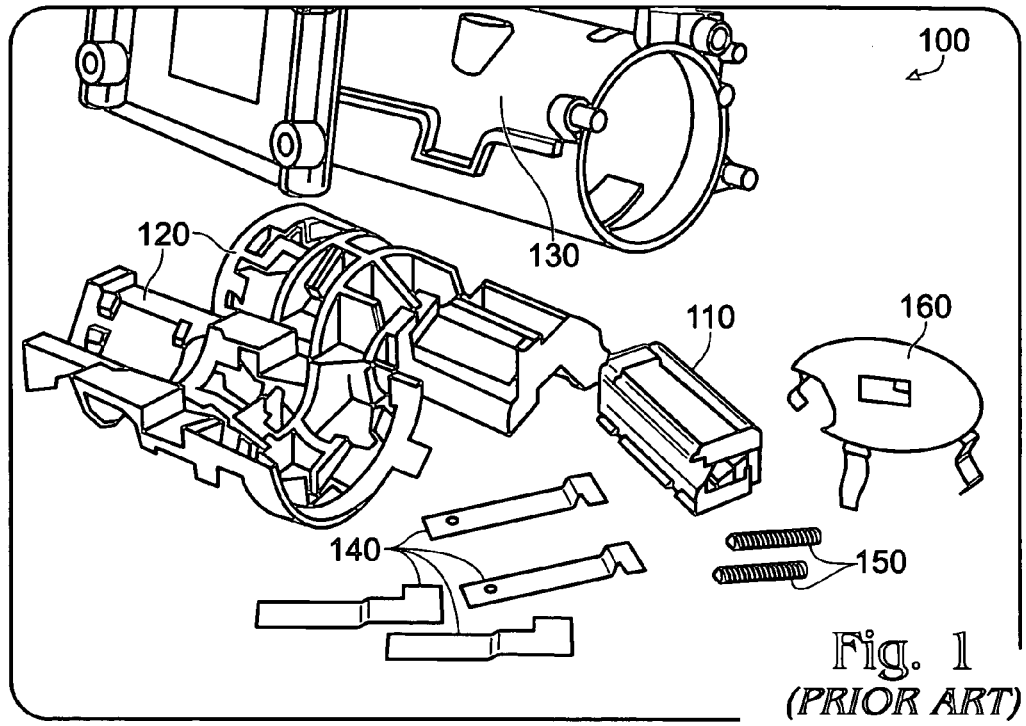
FIG. 1 is a drawing illustrating a prior art light tunnel assembly that has been disassembled.
Figure 2:
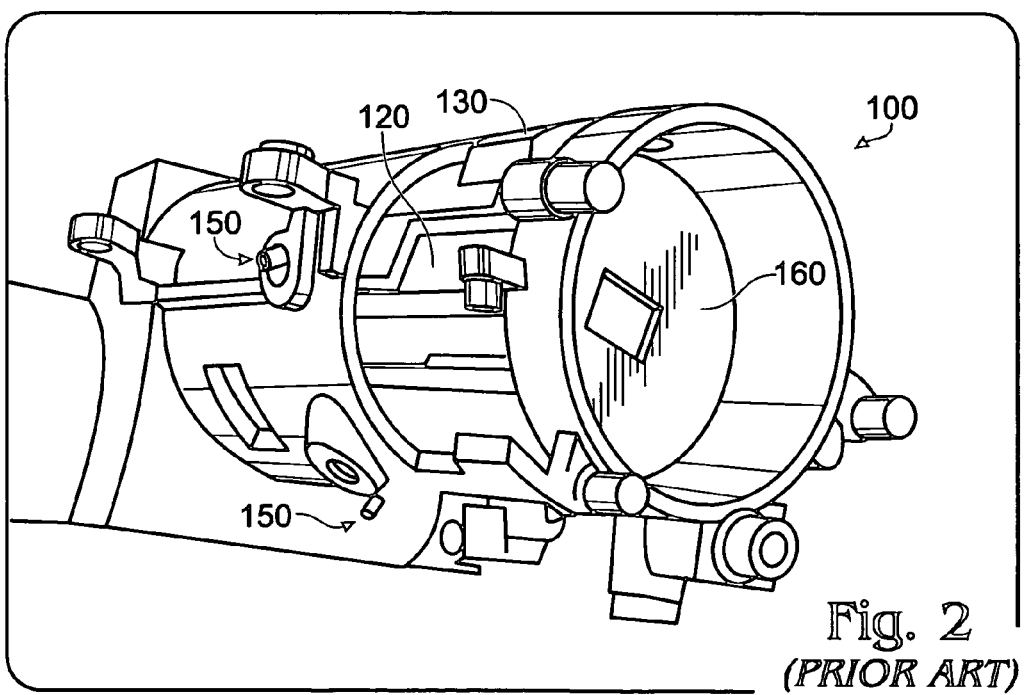
FIG. 2 is a drawing illustrating the light tunnel assembly of FIG. 1, as assembled.
Figure 3:
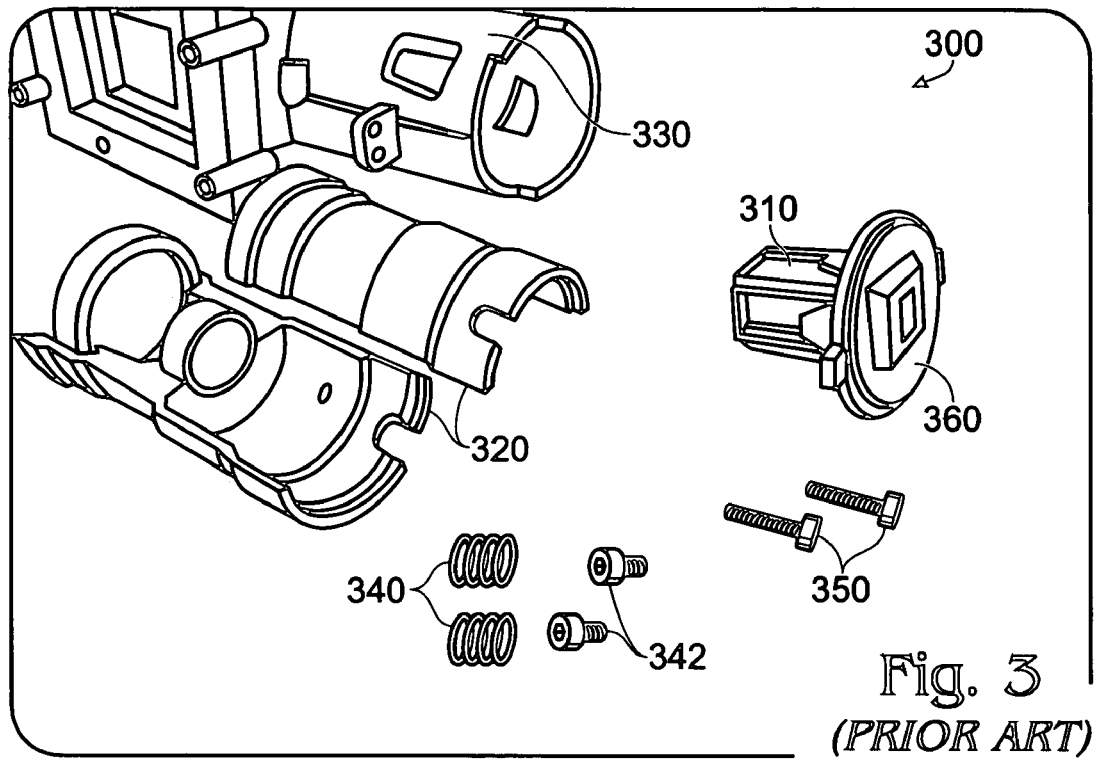
FIG. 3 is a drawing of another prior art light tunnel assembly that has been disassembled.
Figure 4:
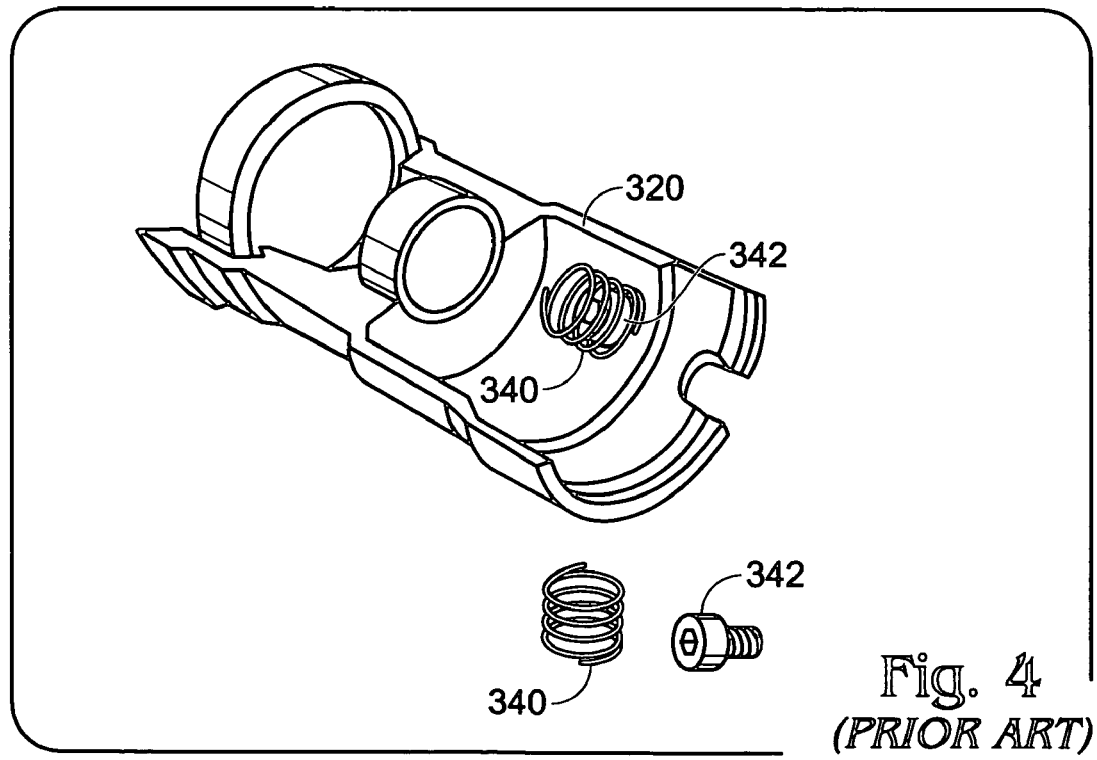
FIG. 4 is a drawing illustrating the light tunnel of FIG. 3, as assembled.
Figure 5:
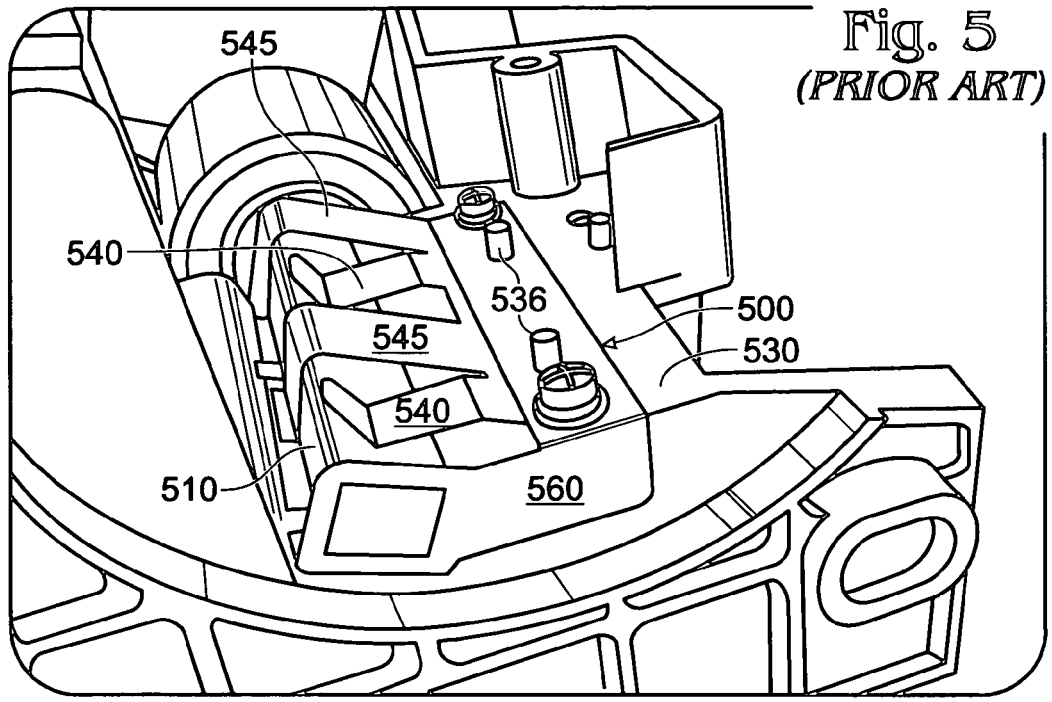
FIG. 5 is a drawing illustrating yet another prior art light tunnel assembly that employs a mirror device for modifying the path of integrated light from the light tunnel.

While embodiments of light tunnel retention and adjustment assemblies and components of such assemblies are generally discussed herein with respect to display projectors, it will be appreciated that the invention is not limited in these respects and that embodiments of the invention may be implemented in other types of optical systems. Also, it will be appreciated that the drawings are for purposes of illustration and the elements shown in the drawings are not necessarily to scale. Further in the drawings, like elements are referenced using like reference numbers. It will be appreciated that these elements may not be identical to each other but may merely serve a like function in the embodiments illustrated.

1. Retention and Adjustment Spring Mechanism

Figure 6:
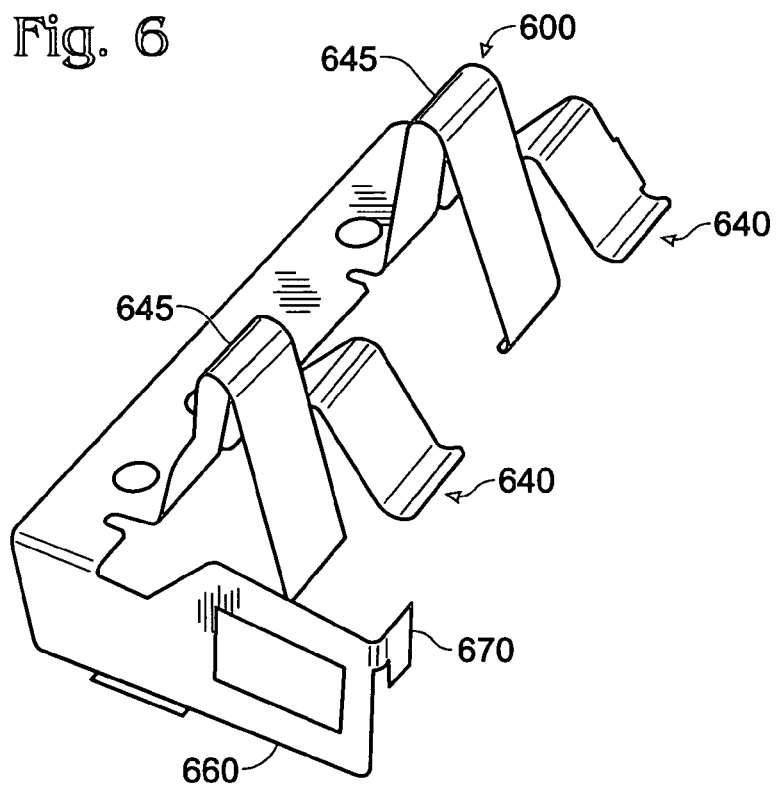
FIG. 6 is drawing illustrating a retention and adjustment spring mechanism.

Referring to FIG. 6, a retention and adjustment spring mechanism (hereafter retention/adjustment mechanism) 600 that is employed in a light tunnel assembly to provide for rigid retention and adjustment of a light tunnel (not shown in FIG. 6) in a projection display system (hereafter "projector") is illustrated. The retention/adjustment mechanism 600, which is a single piece, may be formed of stainless steel (e.g., 301 half hard), for example. Alternatively, the retention/adjustment mechanism 600 may be formed of any material (such as other grades of steel, copper or thermally resistant plastics) having spring properties similar to those of 301 stainless steel and that may be formed in the fashion shown in FIG. 6.

The retention/adjustment mechanism 600 includes two y-axis spring fingers 640 for providing retention of a light tunnel in a y-axis. It will be appreciated that, as described herein, the orthogonal Cartesian axes referenced are relative to the components used in a light tunnel assembly for use in a projector. The Cartesian axes are used herein for purposes of illustration and to provide points of reference. The y-axis spring fingers 640 also provide a compliant spring force for effecting adjustment of a light tunnel in the y-axis, as is explained in further detail below.

The retention/adjustment mechanism 600 further includes two x-axis spring fingers 645 for providing retention of a light tunnel in an x-axis. The x-axis spring fingers 645, in like fashion as the y-axis spring fingers, also provide a compliant spring force for affecting adjustment of a light tunnel in the x-axis, as is explained in further detail below.

The retention/adjustment mechanism 600 also includes a shield 660 that prevents excessive light, heat and/or radiation from being communicated from an illumination source in the projector to the light tunnel of the projector, thus preventing damage and or degradation to, for example, adhesives and optical coatings used in the light tunnel. The shield 660 also acts as a z-axis spring finger for providing retention of the light tunnel in the z-axis. The retention/adjustment mechanism 600 still further includes a retention clip 670 that provides for rigid retention of the light tunnel by interfacing with an optics chassis of the light tunnel.

2. Optics Chassis

Figure 7:
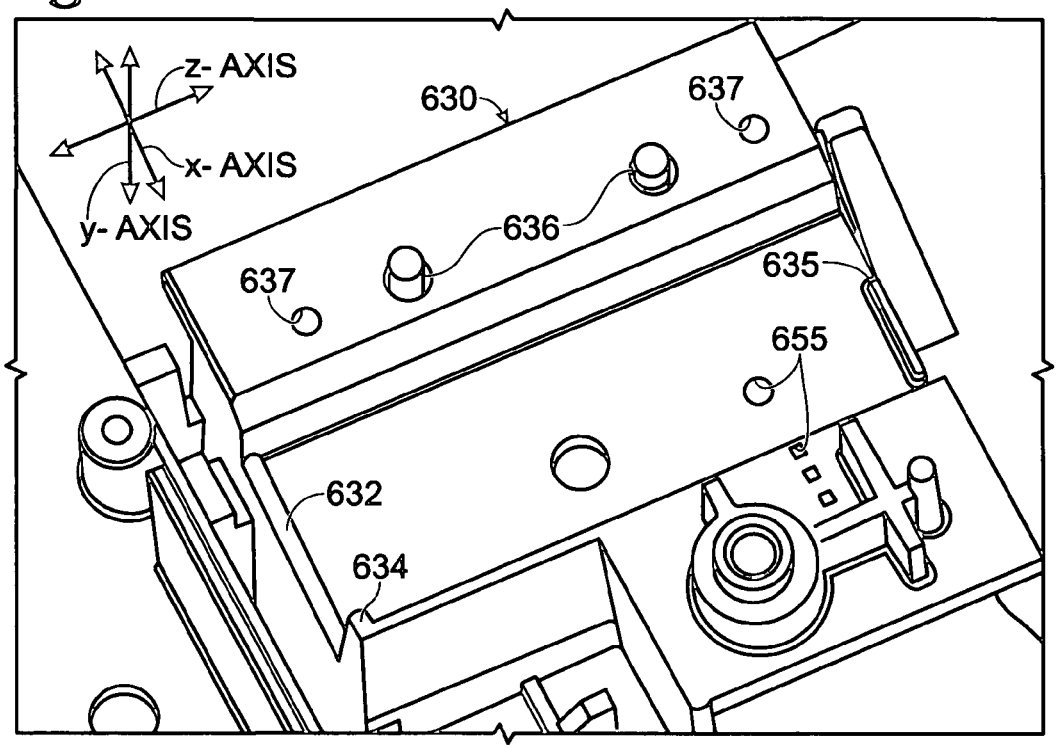
FIG. 7 is a drawing illustrating an optics chassis in which a light tunnel is mounted using the retention/adjustment mechanism of FIG. 6.

Referring to FIG. 7, an optics chassis 630 that may by used in conjunction with the retention/adjustment mechanism 600 of FIG. 6 to provide for rigid retention and adjustment of a light tunnel in a projector is shown. The optics chassis 630 includes a y-axis datum rib 632, an x-axis datum rib 634 and a z-axis datum rib 635. It is noted that the datum ribs are oriented perpendicular to the Cartesian axes of the light tunnel assembly as described herein. The x-axis datum rib 634 and the y-axis datum rib 632 are half-round surfaces that provide support for the light tunnel along the x-axis and y-axis. The half-round structure of the ribs also allows for ease of movement of the light tunnel when an adjustment to its alignment is made. The optics chassis 630 also includes a z-axis datum rib 635 which provides for support of the light tunnel along the z-axis.

The optics chassis 636 further includes mounting posts 636 and mounting screw holes 637. The posts 636 and screw holes 637 are used for coupling the retention/adjustment mechanism 600 with the optics chassis 630 to provide rigid retention of the light tunnel and to allow for adjustment of the light tunnel in a projector. To effect adjustment of the light tunnel when mounted in the optics chassis 630, adjustment screws may be threaded into adjustment screw holes 655 in the optics chassis 630. The x-axis adjustment screw hole is shown by a dashed line in FIG. 7, as that screw hole is hidden from view in this particular drawing. The relationship between the retention/adjustment mechanism 600 of FIG. 6 and the optics chassis 630 is described in further detail below with reference to FIGS. 8–10.

3. Light Tunnel Assembly

Figure 8:
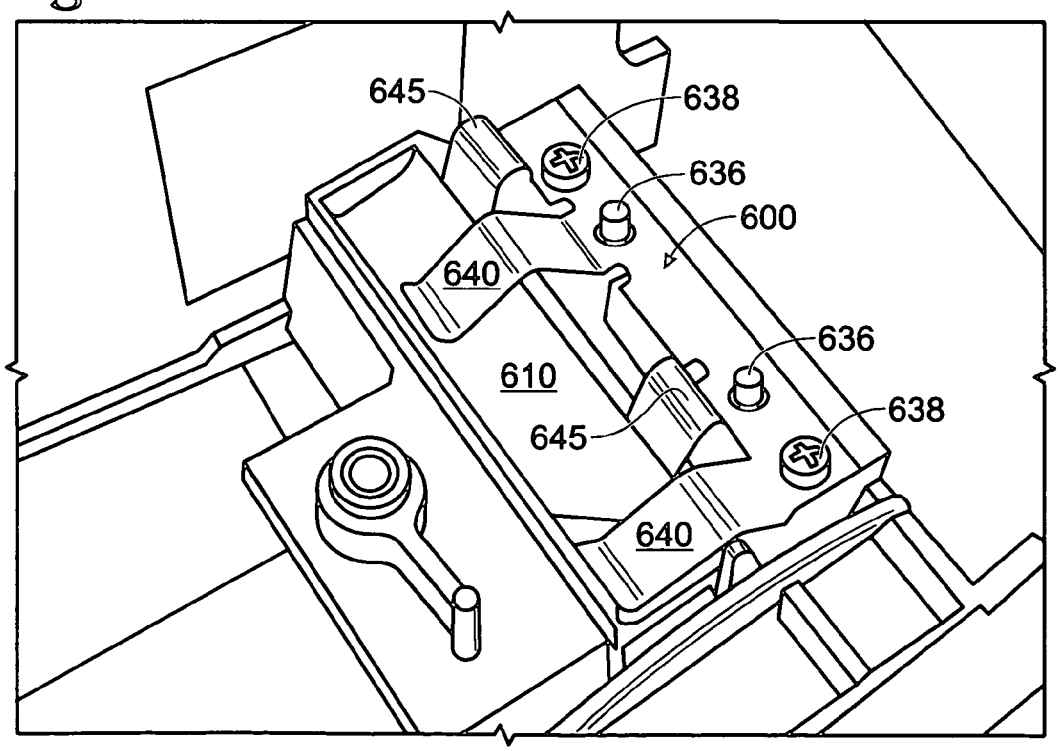
FIG. 8 is a photograph illustrating a light tunnel assembly that includes a retention/adjustment mechanism and an optics chassis that are substantially the same as those shown in FIGS. 6 and 7, respectively.

Referring now to FIG. 8, an assembled light tunnel assembly that includes a light tunnel 610, a retention/adjustment mechanism 600 and an optics chassis 630 is shown. As may be seen in FIG. 8, the x-axis spring fingers 645 are disposed in a compressed state on a side of the light tunnel 610. This arrangement provides a compliant spring force for fixedly retaining the light tunnel 610 in the x-axis. Further the compliance and/or spring force of the x-axis spring fingers 645 allows for adjustment of the light tunnel in the x-axis using the adjustment screw 650. As may also be seen in FIG. 8, the y-axis spring fingers 640 are disposed in a protracted state on the top of the light tunnel 610. This arrangement provides a compliant spring force for fixedly retaining the light tunnel 610 in the y-axis. Further the spring force and/or compliance of the y-axis spring fingers 640 allows for adjustment of the light tunnel in the y-axis using another adjustment screw (not shown).

The retention/adjustment mechanism 600 is installed in the tunnel assembly by placing the retention/adjustment mechanism 600 over the posts 636 of the optics chassis 630. As is shown in FIGS. 6 and 8, the retention/adjustment mechanism 600 includes corresponding holes for such placement. The retention/adjustment mechanism 600 may then be fixedly coupled with the optics chassis 630 using the mounting screws 638, which are threaded into the mounting screw holes 637 (not visible) in the optics chassis 630.

Figure 9:
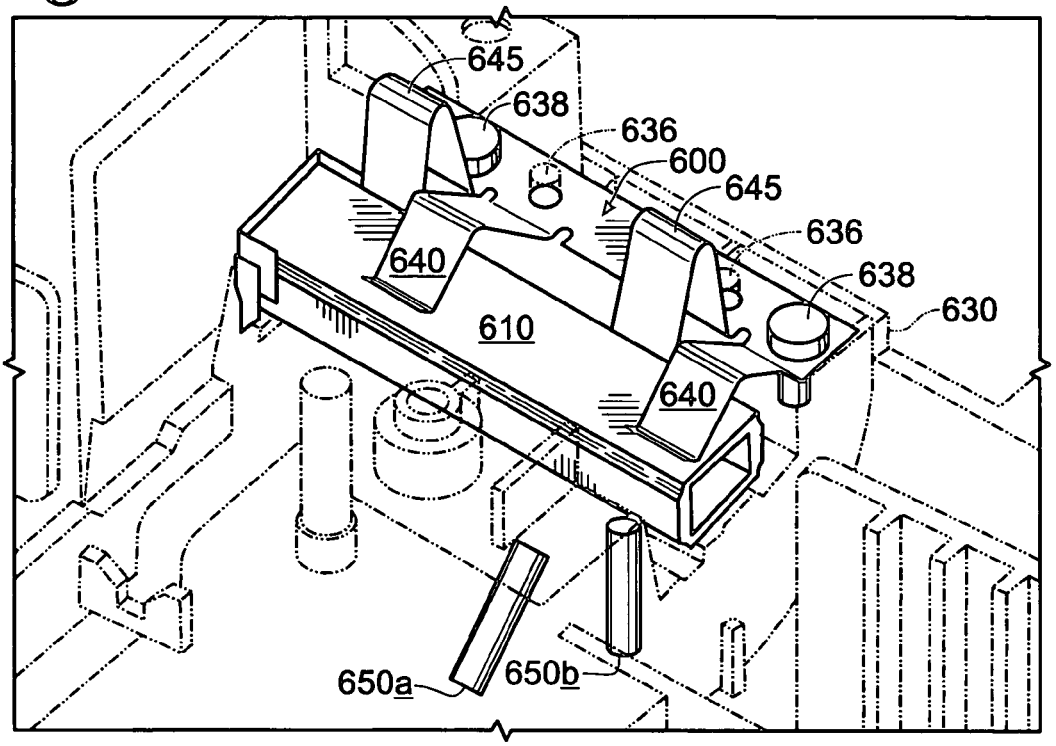
FIG. 9 is a drawing illustrating a light tunnel assembly that includes the retention/adjustment mechanism of FIG. 6 and the optics chassis of FIG. 7.

Referring to FIG. 9, a drawing illustrating a light tunnel assembly is shown that includes a light tunnel 610, the retention/adjustment mechanism 600 of FIG. 6 and the optics chassis 630 of FIG. 7. It is noted that the x-axis spring fingers 645 and the y-axis spring fingers 640 are not shown properly deflected in this drawing but, when installed, bend in similar fashion as shown in FIG. 8. The arrangement of the adjustments screws 650 for the light tunnel assembly may be seen in FIG. 9. The adjustment screws 650 provide for adjusting the alignment of the light tunnel 610 in the x-axis (using the angled adjustment screw 650a) and for adjustment of the light tunnel 610 in the y-axis (using the adjustment screw 650b disposed on the underside of the light tunnel 610). The compliance and/or spring force of the x-axis spring fingers 645 and the y-axis spring fingers 640 provides for adjustment in either direction along each of these axes being effected by either threading the adjustment screws 650 further in or, alternatively, threading them out of the screw holes 655 (as shown in FIG. 7).

Figure 10:
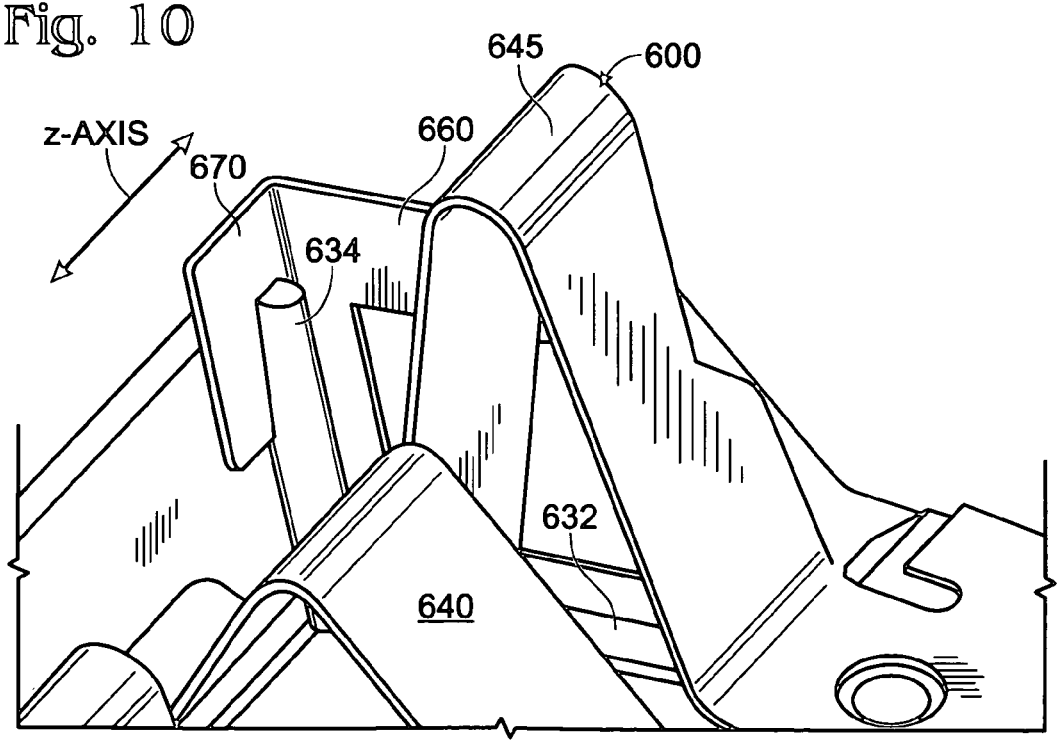
FIG. 10 is a drawing illustrating an interface between a retention clip of the retention/adjustment mechanism of FIG. 6 and the optics chassis of FIG. 7.

FIG. 10 is a drawing that illustrates, in more detail, the interface between the retaining hook 670 of the retention/adjustment mechanism 600 and the optics chassis 630. As may be seen in FIG. 10, the retaining hook 670 is disposed over the top of the y-axis datum rib 634. This configuration provides for rigid retention of the light tunnel 610 (not shown) in a tunnel assembly, such as those shown in FIGS. 8 and 9. Specifically, the retention hook will retain the light tunnel fixedly in the z-axis and also prevents rotation of the retention/adjustment mechanism 600 in the light tunnel assembly.

Conclusion

Various arrangements and embodiments in accordance with the present invention have been described herein. It will be appreciated, however, that those skilled in the art will understand that changes and modifications may be made to these arrangements and embodiments without departing from the true scope and spirit of the present invention, which is defined by the following claims.

What is claimed is:

1. A light tunnel retention and adjustment mechanism for retaining and aligning a light tunnel in a light tunnel assembly, the light tunnel retention and adjustment mechanism comprising:
   one or more first compliant spring fingers, which interface with the light tunnel along a first surface to provide a compliant spring force for adjusting alignment of the light tunnel in a first axis and fixedly retaining the light tunnel in position in the first axis; and
   one or more second compliant spring fingers, which interface with the light tunnel along a second surface to provide a compliant spring force for adjusting alignment of the light tunnel in a second axis and fixedly retaining the light tunnel in position in the second axis, wherein the second surface is different than the first surface and the second axis is substantially orthogonal to the first axis.

2. The light tunnel retention and adjustment mechanism of claim 1, wherein the light tunnel retention and adjustment mechanism is formed as a unitary piece.

3. The light tunnel retention and adjustment mechanism of claim 2, wherein the unitary piece is formed of stainless steel.

4. The light tunnel retention and adjustment mechanism of claim, 3, wherein the stainless steel is 301 half hard stainless steel.

5. The light tunnel retention and adjustment mechanism of claim 2, wherein the unitary piece is formed of a material having substantially the same spring properties as 301 half hard stainless steel.

6. The light tunnel retention and adjustment mechanism of claim 1, further comprising:
a shield limiting an amount of at least one of light, heat and radiation communicated to the light tunnel from an illumination source.

7. The light tunnel retention and adjustment mechanism of claim 6, wherein the shield comprises a retention hook, the shield and the retention hook retaining the light tunnel in a substantially fixed position in a third axis, wherein the third axis is substantially orthogonal to the first axis and the second axis.

8. The light tunnel retention and adjustment mechanism of claim 1, further comprising:
a shield limiting an amount of at least one of light, heat and radiation communicated to the light tunnel from an illumination source and retaining the light tunnel in a substantially fixed position in a third axis, wherein the third axis is substantially orthogonal to the first axis and the second axis.

9. The light tunnel retention and adjustment mechanism of claim 1, further comprising:
a plurality of alignment holes for orienting the light tunnel retention and adjustment mechanism with an optics chassis in a light tunnel assembly; and
a plurality of mounting screw holes for receiving a plurality of mounting screws to fixedly couple the light tunnel retention and adjustment mechanism with the optics chassis.

10. The light tunnel retention and adjustment mechanism of claim 1, further comprising a retention hook fixedly retaining the light tunnel in a substantially fixed position in a third axis and preventing rotation of the light tunnel, wherein the third axis is substantially orthogonal to the first axis and the second axis.

11. A light tunnel assembly comprising:
a light tunnel;
a unitary retention and adjustment mechanism comprising:
a first plurality of compliant spring fingers, which interface with the light tunnel along a first surface to provide a compliant spring force for adjusting alignment of the light tunnel in a first axis and fixedly retaining the light tunnel in position in the first axis;
a second plurality of compliant spring fingers, which interface with the light tunnel along a second surface to provide a compliant spring force for adjusting alignment of the light tunnel in a second axis and fixedly retaining the light tunnel in position in the second axis, wherein the second surface is different than the first surface and the second axis is substantially orthogonal to the first axis; and
a shield limiting an amount of at least one of light, heat and radiation communicated to the light tunnel from an illumination source and retaining the light tunnel in a substantially fixed position in a third axis, wherein the third axis is substantially orthogonal to the first axis and the second axis;
an optics chassis receiving the light tunnel and the retention and adjustment mechanism, wherein one or more mounting screws fixedly couple the retention and adjustment mechanism with an optics chassis; and
a plurality of adjustment screws inserted in the optics chassis applying respective forces to the light tunnel so as to adjust alignment of the light tunnel in at least the first axis and the second axis with respect to other components of an optical assembly in a display device.

12. The light tunnel assembly of claim 11, wherein the optics chassis comprises a plurality of alignment posts for orienting the retention and adjustment mechanism in the light tunnel assembly.

13. The light tunnel assembly of claim 11, wherein the optics chassis comprises:
a first datum rib perpendicular to the first axis;
a second datum rib perpendicular to the second axis; and
a third datum rib perpendicular to the third axis,
wherein the first datum rib, the second datum rib and the third datum rib provide mechanical support for the light tunnel along, respectively, the first axis, the second axis and the third axis.

14. The light tunnel assembly of claim 13, wherein the first datum rib and the second datum rib are half-round structures.

15. The light tunnel assembly of claim 13, wherein the third datum rib is a half-round structure.

16. The light tunnel assembly of claim 11, wherein the plurality of adjustment screws comprise:
a first adjustment screw for adjusting alignment of the light tunnel in the first axis; and
a second adjustment screw for adjusting alignment of the light tunnel in the second axis.

17. The light tunnel assembly of claim 16, wherein the first adjustment screw is angled with respect to the first axis, wherein the angle formed by the first adjustment screw and the first axis is greater than zero degrees and less than ninety degrees.

18. The light tunnel assembly of claim 11, wherein the plurality of adjustment screws effect adjustment of the light tunnel by directly applying force to the light tunnel.

19. The light tunnel assembly of claim 11, wherein the plurality of adjustment screws effect adjustment of the light tunnel by indirectly applying force to the light tunnel.

20. The light tunnel assembly of claim 11, wherein the retention and adjustment mechanism is formed of one of 301 half hard stainless steel and a material having substantially the same spring properties as 301 half hard stainless steel.

21. The light tunnel assembly of claim 11, wherein the retention and adjustment mechanism further comprises a retention hook, the retention hook further retaining the light tunnel in a substantially fixed position in the third axis.

22. A light tunnel retention and adjustment mechanism for retaining and adjusting a light tunnel in a light tunnel assembly, the light tunnel retention and adjustment mechanism comprising:
a first plurality of compliant spring fingers, which interface with the light tunnel along a first surface to provide a compliant spring force for adjusting alignment of the light tunnel in a first axis and fixedly retaining the light tunnel in position in the first axis;
a second plurality of compliant spring fingers, which interface with the light tunnel along a second surface to provide a compliant spring force for adjusting alignment of the light tunnel in a second axis and fixedly retaining the light tunnel in position in the second axis, wherein the second surface is different than the first surface and the second axis is substantially orthogonal to the first axis;

a shield including a retention hook, the shield limiting an amount of at least one of light, heat and radiation communicated to the light tunnel from an illumination source, the shield and the retention hook retaining the light tunnel in a substantially fixed position in a third axis wherein the third axis is substantially orthogonal to the first axis and the second axis;

a plurality of alignment holes formed in the light tunnel retention and adjustment mechanism for orienting the light tunnel retention and adjustment mechanism with an optics chassis in a light tunnel assembly; and a plurality of mounting screw holes formed in the light tunnel retention and adjustment mechanism for receiving a plurality of mounting screws to fixedly couple the light tunnel retention and adjustment mechanism with the optics chassis.

23. The light tunnel retention and adjustment mechanism of claim 22, wherein the light tunnel retention and adjustment mechanism is formed as a unitary piece.

* * * * *

UNITED STATES PATENT AND TRADEMARK OFFICE
CERTIFICATE OF CORRECTION

| | | |
|---|---|---|
| PATENT NO. | : 7,076,145 B2 | Page 1 of 1 |
| APPLICATION NO. | : 10/956264 | |
| DATED | : July 11, 2006 | |
| INVENTOR(S) | : Takatoyo Kitamura, Stephen Dorow and Wong Tuck Meng | |

It is certified that error appears in the above-identified patent and that said Letters Patent is hereby corrected as shown below:

Title Page item 73, delete "In Focus Corporation" and insert --InFocus Corporation-- therefor.

Signed and Sealed this

Third Day of November, 2009

David J. Kappos
*Director of the United States Patent and Trademark Office*